Feb. 25, 1969     S. J. GONZALES     3,429,278
MEATHOOK HOLDER ARRANGEMENT
Filed March 20, 1967
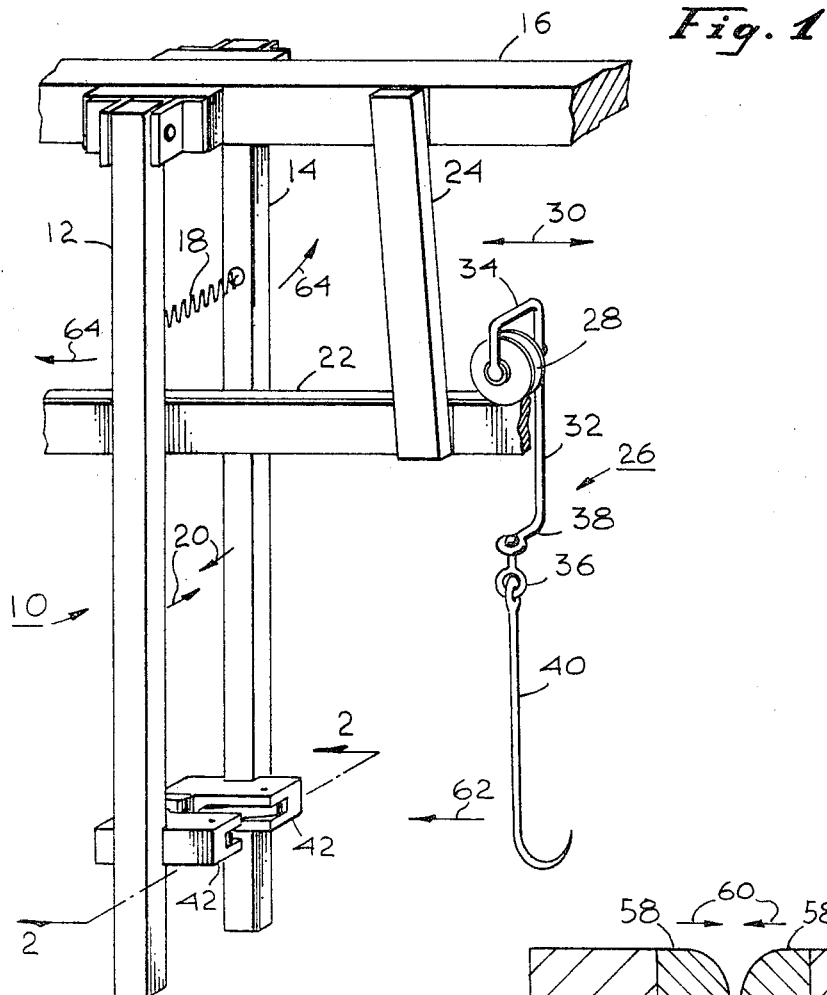
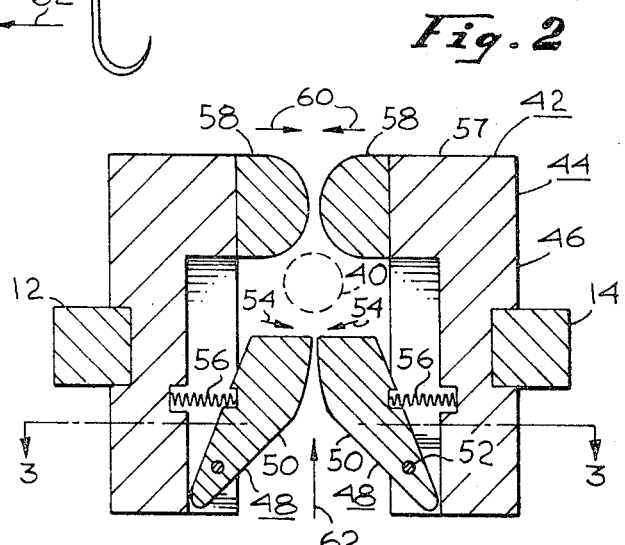
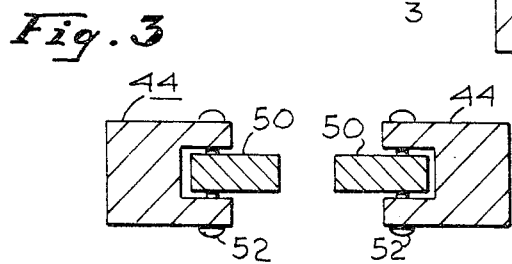
INVENTOR
SALVADOR J. GONZALES
BY
Don Finkelstein
ATTORNEY United States Patent Office 3,429,278
Patented Feb. 25, 1969

3,429,278
MEATHOOK HOLDER ARRANGEMENT
Salvador J. Gonzales, 4945 Eldred St.,
Los Angeles, Calif. 90042
Filed Mar. 20, 1967, Ser. No. 624,577
U.S. Cl. 104—89       5 Claims
Int. Cl. B61b 3/00; E01b 25/24

ABSTRACT OF THE DISCLOSURE

There is disclosed herein an improved meathook holder for temporarily restraining motion of a traveling meathook along a rail. A pair of arms are positioned on either side of the rail and are spring loaded to be biased towards each other and the restraint means coupled to the arms resist motion of the meathook while traveling along the rail in a first direction. A latch means which allows comparatively free movement of the meathook between the arms in the first direction, but prevents motion of the meathook in an opposite direction. The meathook is thus held between the latch means and the restraint means during the loading or unloading of meat from the hook and then may be pushed through the restraint means for further travel as desired, the spring biasing the arms yieldingly resisting but nevertheless allowing such motion through the restraint means.

Background of the invention

*Field of the invention.*—This invention relates to the meathook holder art and more particularly to an improved arrangement for temporarily restraining meathooks during meat hanging and removing operations.

*Description of the prior art.*—It is common practice to utilize meathooks of the so-called "traveling type" or in storage docks or other areas for loading and unloading meat from railroad cars, trucks and the like. In practice, a plurality of these traveling meathooks are movably mounted on a supporting rail which is located somewhere near the edge of the dock and extend to the storage area within an adjacent building. Thus, when a railroad car, such as a refrigerated railroad car or the like, is parked along the side of the dock, each of the meathooks is moved along the rail to a position adjacent the door of the railroad car or truck and a suitable slab of meat hung thereon. The hook containing the meat is then moved along the rail to the refrigerated storage container within the building where the meat is removed from the hook and, simultaneously, the next succeeding hook is brought to a position adjacent the door of the truck or car and another slab of meat is hung thereon. Obviously, this operation is reversed if it is intended to load the car or truck. In many applications, of course, the meathook is manually carried from the position where the meat is unloaded from the hook to the position where the meat is loaded onto the hook and it travels on the rail between the position where the meat is loaded onto the hook and the position where it is unloaded therefrom.

However, in order to prevent excessive exposure of refrigerated meat to unrefrigerated atmosphere for any length of time it is preferred that the operation be carried out at a rapid pace. This is especially true in warm and dry weather. The slabs of meat that are hung on such hooks are usually rather large and weigh a considerable amount. The hooks commonly utilized are freely swingable on a form of trolley which is, in turn, mounted on the rail to provide the traveling feature of the hook. As the hook is freely swingable, it is often difficult for one man to either attach the slab of meat to the meathook or remove the meat therefrom. In usual practice, one man is required to hold the hook while another man attaches the slab of meat to the hook. It is generally considered inefficient and even somewhat dangerous for one man to perform this operation alone. In fact, when the weight of the meat becomes comparatively large, it is virtually impossible for one man to hook the meat onto the hook or remove it therefrom by himself.

However, it is also desired, as noted above, that the loading and unloading of the meat be carried out as rapidly as possible and preferably by one man at each position. Therefore, a meathook holder or restraining means is preferred that does not require utilization of another man to operate the holder, which would defeat the purpose of having the meathook holder and preferably securely restrains the meathook during the loading or unloading operation. Further, since the person performing the loading or unloading generally does not have a hand free for operation of any mechanism, it is preferred that the meathook holder be automatic in operation and not require any manual manipulation.

Summary

Accordingly, it is an object of applicant's invention herein to provide an improved meathook holder.

It is another object of applicant's invention herein to provide a meathook holder that operates automatically in restraining movement of a traveling meathook.

The above and other objects of applicant's invention are achieved in one embodiment of applicant's invention wherein there are provided a pair of arm means depending from either side of the rail upon which the traveling meathook moves. One arm means is on each side of the rail and a spring means is coupled to each of the arm means to bias the arm means together and the arm means are pivotally mounted with respect to the rail for pivotal motion in a plane substantially perpendicular to the direction of the rail.

The lower end of the arm means are each provided with a clamp means. In this embodiment of applicant's invention the clamp means has a latch means adjacent the forward edge of the clamp means that allows the comparatively free motion of the meathook between the arm means for travel of the meathook in a first direction. However, the latch means prevents motion of the meathook in the opposite direction after it has once passed the latch means.

A restraint means is spaced from the latch means a preselected distance and the restraint means on each of the clamp means are forced into close proximity by the spring means biasing the two arms towards each other. The restraint means thus yieldingly restrains the meathook between the restraint means and the latch means. The tension in the spring determines how hard a force must be exerted on the meathook to push it through the restraint means. Thus, with a properly selected spring the meathook may be substantially held between the arm means and intermediate the restraint means and the latch means during the loading and unloading of meat from the meathook. For example, after a slab of meat has been hung on the meathook the entire meathook with the slab of meat thereon may be pushed through the restraint means, with the abovementioned spring means yieldingly resisting such motion.

Brief description of the drawing

The above and other embodiments of applicant's invention may be more clearly understood from the following detailed description taken together with the accompanying drawing, wherein similar reference characters refer to similar elements throughout and in which:

FIGURE 1 is a perspective drawing of one embodiment of applicant's invention;

FIGURE 2 is a sectional view along the line 2—2 of FIGURE 1; and

FIGURE 3 is a sectional view along the line 3—3 of FIGURE 2.

Description of the preferred embodiments

Referring now to the drawing, there is shown a preferred embodiment of applicant's invention illustrating the best mode known to the inventor of taking advantage of same. In FIGURE 1 there is illustrated a perspective view of one embodiment of my invention as contemplated for use with a traveling meathook.

Applicant's improved meathook holder is generally designated 10 and is comprised of a pair of arms 12 and 14 that are pivotally mounted on a supporting beam 16. A first spring means 18 is utilized to bias the arm means 12 and 14 towards each other as indicated by the arrows 20.

As shown on FIGURE 1, a rail means 22 is supported by support 24 from the beam means 16 and a meathook generally designated 26 travels on the rail means 22. The meathook 26 may be comprised of a trolley means 28 that rollingly engages the rail means 22 to provide the motion of the meathook in the direction indicated by the double ended arrow 30. A meathook support 32 is journaled on the trolley 28 at a first end 34 thereof and has an eyelet means 36 dependent from a second end 38 thereof. A meathook 40 is swingably mounted on the eyelet 36 and is carried in a direction indicated by the double arrow 30. The meathook and the movable means therefor are conventional and, therefore, the detailed structure and operation is neither illustrated nor described in detail herein. The meathook 26 is described herein only to illustrate the manner of operation of the present invention and should be understood that the present invention is suitable for use with any type of movable meathook. It is common practice in the meat industry to employ meathooks of different lengths and/or different diameters which are respectively adapted for different sizes and styles of meat. Since such meathooks differ from the meathook A only in dimension, such other forms of meathooks are not illustrated or described herein and applicant's improved meathook holder 10 can equally well be utilized with any desired style of meathook.

A clamp means 42 is coupled to a second end of each of the arm means 12 and 14 and the clamp means 42 are identical. As shown in greater detail on FIGURES 2 and 3, the clamp means 42 is generally comprised of body member 44 having an outside surface 46 coupled to the arm means 12 or 14.

The body means 44 further has an inside surface 46 to which there is pivotally mounted a latch means 48. The latch means comprises a catch member 50 that is pivotally mounted by pivot pin means 52 to the inside surface 46 of the body member 44 and each of the latch means 48 are biased to move towards each other in a direction indicated by the arrows 54 by second spring means 56. In the embodiment shown on FIGURE 2 the two catch members 50 do not actually touch. However, it will be appreciated that the two catch members 50 may have physical contact with each other under the urging of the second spring means 56 if desired. It is only necessary that, if space is allowed between the catch members 50, that this spacing be less than the diameter of the meathook 40. In FIGURE 2 there is shown in dotted section the meathook 40 as positioned between the arm means 12 and 14 when it is being restrained by applicant's improved meathook holder 10.

The body member 44 also has an end portion 57 to which there is coupled restraining means 58. Because of the comparatively hard usage to which applicant's improved meathook holder 10 is subjected during practical operation thereof, applicant prefers that the restraining means 58 be detachably coupled to the body member 44 in order that when they wear out from frictional engagement with the meathook 40, as described below, they may be replaced without necessitating replacement of the entire clamp means 42. As shown on FIGURE 2, the restraining means 58 are urged and biased towards each other in the direction indicated by the arrows 60 under the influence of the first spring means 18.

In the operation of applicant's invention, a piece of meat (not shown) is desired to be hung upon the meathook 40. However, because of the free swinging nature of the meathook 40, this hanging of the meat thereon cannot generally be accomplished with comparative ease by one man. However, in utilizing applicant's improved meathook holder 10, such operation is easily and readily accomplished by one person. Thus, the heat-hook 40 is moved in a direction indicated by the arrow 62 towards the meathook holder 10 and first engages the clamp members 50 of the latch means 48. The second springs 56 are comparatively light and allow relatively free passage of the meathook 40 therebetween until it passes the catch members 50 until it occupies the position between the catch members 50 and the restraining means 58 which are spaced apart from the latch means 48. This position is indicated in dotted lines in FIGURE 2.

Applicant has discovered that in the loading and unloading of meat from the meathook 40 generally the forces exerted on the meathook 40 are constrained to a vertical or nearly vertical plane with very little force being transmitted thereto in the horizontal plane. Therefore, the stiffness of the first spring means 18 is selected so that the restraining means 58 are biased together by such a force sufficient that the arm means cannot be spread apart during the loading or unloading of meat from the meathook 40 and the forces associated therewith. However, when the meat has been loaded on the meathook 40, for example, a horizontal force in the direction indicated by the arrow 62 may be exerted on the meathook 40 which then is forced between the restraining means 58 and the spring means 18 yieldingly resists such motion as the arm means 12 and 14 pivot in the directions indicated by the arrow 64 to allow the passage of the meathook 40 therebetween. The first spring means 18 then returns the arm means 12 and 14 to the position indicated in FIGURE 1.

Thus, in utilizing applicant's improved meathook holder 10, the meathook 40 is temporarily restrained from movement when it is positioned intermediate the latch means 48 and the restraining means 58 and between the arm means 12 and 14 so that meat may be loaded thereon or removed therefrom. The pivotal motion of the arm means 12 and 14 in a plane substantially perpendicular to the direction of travel indicated by the arrow 30 of the meathook 40 allows the spreading apart of the arm means 12 and 14 so that the meathook 40 may be pushed therethrough when it is desired to so move the meathook 40.

Because of the pivotal mounting of the arm means 12 and 14 it will be appreciated that applicant's improved meathook holder 10 may uniquely be swung away from the position shown in FIGURE 1 if the particular area occupied by the meathook holder 10 is not utilized during nonmeat loading and unloading operations. Thus, by disconnecting the first spring means 18 from one or the other of the arms 12 and 14 they may be swung upwardly to the plane of the beam 16 and restrained therein by any desired means.

From the above it is apparent that applicant has provided an improved meathook holder that automatically restrains a traveling meathook during loading and unloading. Those skilled in the art may find many variations and adaptations of applicant's improved meathook holder and the following claims are intended to cover all such variations and adaptations falling within the true scope and spirit of applicant's invention.

What is claimed as new and desired to be secured by Letters Patent of the United States is:

1. A meathook holder for temporarily restraining the movement of a track mounted traveling meathook comprising, in combination:
   a pair of arm means depending from and having a first end pivotally mounted with respect to the track supporting the meathook, for pivotal motion in a plane perpendicular to the direction of movement of the hook on the track;
   first spring means coupled to said arm means to bias each of said pair of said arms toward the other thereof, for yieldingly resisting motion of each of said arm means away from the others;
   each of said pair of arm means having a second end, and a clamp means coupled thereto, and each of said clamp means comprising:
      restraint means for engaging the meathook for yieldingly resisting motion of the meathook between said pair of arms;
      latch means for engaging the meathook and allowing motion of the meathook to a position intermediate said pair of arms for motion of the meathook in a first direction, and preventing motion of the meathook between said pair of arms in a second direction opposite said first direction;
      and said restraint means is spaced apart from said latch means for engaging the meathook for yieldingly restraining the motion thereof in said first direction.

2. The arrangement defined in claim 1 wherein each of said clamp means further comprises:
   a body member having an outside surface coupled to said second end of said arms, and an inside surface;
   said latch means comprises:
      a catch member pivotally mounted on said inside surface of said body member, and each of said catch members mounted for pivotal motion towards and away from the other thereof and between said pair of arms;
      and second spring means for yieldingly biasing each of said catch members towards the other thereof.

3. The arrangement defined in claim 2 wherein said body member further comprises:
   an end portion spaced from said catch member; and
   said restraint means is coupled to said end portion of said body member and positioned intermediate said pair of arms, and each of said restraint means is biased towards the other thereof by said first spring means.

4. The arrangement defined in claim 1 wherein each of said clamp means further comprises:
   a body member having an outside surface coupled to said second end of said arms, and an inside surface, and an end portion;
   said latch means is mounted on said inside surface of said body member, and said end portion of said body member is spaced from said latch means;
   and said restraint means is coupled to said end portion of said body member in spaced apart relationship to said latch means, and positioned intermediate said pair of arms, and each of said restraint means is yieldingly biased towards each other by said first spring means.

5. The arrangement defined in claim 3 wherein said first spring means is stiffer than said second spring means.

References Cited

UNITED STATES PATENTS

| 2,818,031 | 12/1957 | Peele | 104—93 |
| 3,138,114 | 6/1964 | Knippel | 104—89 |
| 3,227,097 | 1/1966 | Chaney | 104—89 |
| 3,323,469 | 6/1967 | Kellam | 104—89 |

ARTHUR L. LA POINT, *Primary Examiner.*

D. F. WORTH III, *Assistant Examiner.*

U.S. Cl. X.R.

104—91, 93